M. HAMBURGER.
CLEAR VISION AND GLAROSCOPE ATTACHMENT FOR WIND SHIELDS.
APPLICATION FILED NOV. 7, 1918.
1,326,448.
Patented Dec. 30, 1919.
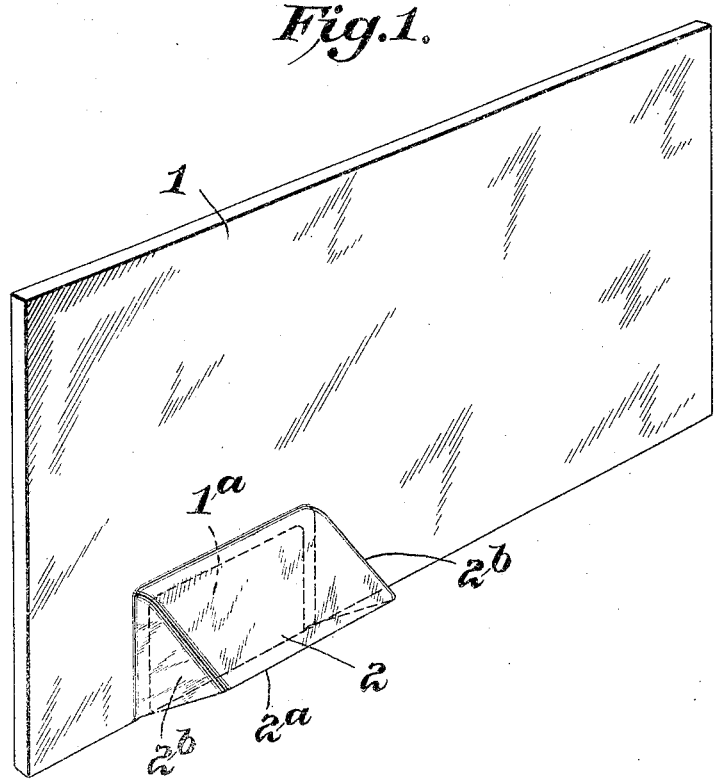
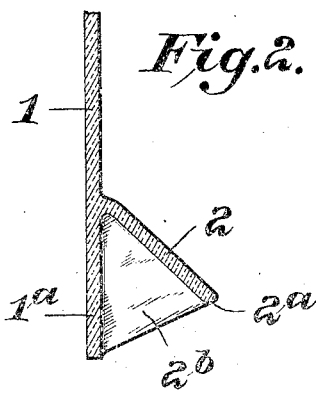
Inventor:
Mark Hamburger,
by Spear, Middleton, Donaldson & Spear
Atty's.

UNITED STATES PATENT OFFICE.

MARK HAMBURGER, OF BALTIMORE, MARYLAND.

CLEAR-VISION AND GLAROSCOPE ATTACHMENT FOR WIND-SHIELDS.

1,326,448.  Specification of Letters Patent.  Patented Dec. 30, 1919.

Application filed November 7, 1918. Serial No. 261,525.

*To all whom it may concern:*

Be it known that I, MARK HAMBURGER, a citizen of the United States, and resident of Baltimore, Maryland, have invented certain new and useful Improvements in Clear-Vision and Glaroscope Attachments for Wind-Shields, of which the following is a specification.

My present invention relates to improvements in wind-shields for motor vehicles and aims to provide a form of wind-shield which will, at a minimum cost, embody means for affording a clear vision to the driver in rainy and snowy weather, and which will also soften or modify the sunlight, thus relieving the driver's eyes of the dazzling effects of the bright sunlight.

The invention includes the novel features of construction hereinafter described and made the subject of the appended claim.

An embodiment of my invention is illustrated in the accompanying drawings, in which, Figure 1 is a perspective view of the pane of wind-shield constructed according to my invention, and Fig. 2 is a central vertical section.

According to my invention I form integral with the upper glass pane of a wind-shield which is indicated at 1, a protecting shield shown at 2, this being in the shape of an outwardly inclined hood having its outer edge $2^a$ sufficiently elevated to just clear the line of vision of the driver, as he looks through the portion $1^a$ of the wind-shield pane lying directly in rear of the hood 2. The space between the hood 2 and the portion $1^a$ is closed at the end by the end walls $2^b$ and it will be understood that the hood 2 and end walls $2^b$ are formed of glass integral with the main wind-shield pane, being formed at the same time therewith and sold as a complete article of manufacture, ready to be installed in the windshield.

This forwardly projecting hood serves to prevent rain or snow from striking against the portion $1^a$ of the wind-shield pane through which the driver normally looks in driving and thus enables him to have a clear vision of the road ahead at all times.

The hood 2 may be formed of amber or other colored glass adapted to modify the light rays, so as to relieve the driver of the usual strain, due to driving in the bright sunlight, or when approaching the lights of another machine.

It will be understood that while I have referred to my invention as designed more specifically for attachments to the wind-shields of motor vehicles it is, of course, not limited to this particular use but is applicable to the windowpane of any moving vehicle, such, for example, as street and Pullman cars and locomotives.

What I claim is:

A wind shield pane of glass having near the lower part and to one side of the center an outwardly and downwardly inclined glass member integrally united to said pane, there being glass portions at the ends of said member integrally uniting it to the face of the pane.

In testimony whereof, I affix my signature.

MARK HAMBURGER.